United States Patent
Mifsud et al.

(10) Patent No.: US 10,106,042 B2
(45) Date of Patent: Oct. 23, 2018

(54) METHODS OF OPERATING CONTACTORS IN HIGH VOLTAGE CIRCUITS OF VEHICLES

(71) Applicant: GM GLOBAL TECHNOLOGY OPERATIONS LLC, Detroit, MI (US)

(72) Inventors: David J. Mifsud, Novi, MI (US); Daniel P. Grenn, Highland, MI (US); Sara Safaeian, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 284 days.

(21) Appl. No.: 14/950,108

(22) Filed: Nov. 24, 2015

(65) Prior Publication Data

US 2017/0144554 A1    May 25, 2017

(51) Int. Cl.
| | |
|---|---|
| *B60L 11/18* | (2006.01) |
| *G05B 15/02* | (2006.01) |
| *H01H 47/02* | (2006.01) |
| *H01H 47/00* | (2006.01) |

(52) U.S. Cl.
CPC .............. *B60L 11/18* (2013.01); *G05B 15/02* (2013.01); *H01H 47/002* (2013.01); *H01H 47/02* (2013.01)

(58) Field of Classification Search
CPC ....... B60L 11/18; G05B 15/02; H01H 47/002; H01H 47/02
See application file for complete search history.

(56) References Cited

U.S. PATENT DOCUMENTS

| | | | | |
|---|---|---|---|---|
| 5,048,479 A | * | 9/1991 | Bartke ................ | F02D 35/0007 123/198 D |
| 6,307,376 B1 | * | 10/2001 | Alexander .............. | F16H 61/12 324/388 |
| 7,459,910 B2 | * | 12/2008 | Kawamura .......... | H01H 47/002 307/39 |
| 8,380,256 B1 | * | 2/2013 | Henneberg .............. | H04W 4/00 323/234 |
| 2002/0057015 A1 | * | 5/2002 | Kikuta ................. | B62D 5/0457 307/10.1 |
| 2003/0007305 A1 | * | 1/2003 | Yugou ................... | B60L 3/0023 361/179 |
| 2008/0262683 A1 | | 10/2008 | Ward et al. | |
| 2011/0298470 A1 | * | 12/2011 | Gokhale ................. | H02M 1/32 324/522 |
| 2015/0210165 A1 | * | 7/2015 | Lachmund ............ | B60L 3/0046 307/10.1 |
| 2015/0224881 A1 | * | 8/2015 | Deyda ..................... | B60R 21/01 701/29.2 |

FOREIGN PATENT DOCUMENTS

CN            101400939 A      4/2009

* cited by examiner

*Primary Examiner* — Zeev V Kitov
(74) *Attorney, Agent, or Firm* — Quinn IP Law

(57) ABSTRACT

Methods of controlling a contactor in a high voltage electrical circuit of a vehicle include delaying a contactor opening if a valid open command is not received, inhibiting closing of a contactor if a low voltage circuit voltage is not sufficient to close the contactor, and determining a fault in the opening of a contactor based on voltages sensed on the contacts of the contactor.

19 Claims, 6 Drawing Sheets

METHODS OF OPERATING CONTACTORS IN HIGH VOLTAGE CIRCUITS OF VEHICLES

TECHNICAL FIELD

The disclosure generally relates to high voltage ("HV") electrical systems and particularly to operating contactors in HV electrical systems in vehicles.

BACKGROUND

Electric and hybrid electric vehicles utilize a high voltage electrical system to drive one or more electric motors and, thus, propel the vehicle. Such systems typically include one or more electrical contactors disposed between a power supply, e.g., a battery, and a load, e.g., the electric motor. Each contactor may "close" to electrically connect the power supply to the load and "open" to electrically disconnect the power supply from the load. Typically, a coil, i.e., an electromagnet, is utilized to close the contactor, as is appreciated by those skilled in the art.

SUMMARY

In one exemplary embodiment, a method of controlling a contactor in a high voltage ("HV") electrical circuit of a vehicle includes monitoring a signal for at least one of a valid close contactor command and a valid open contactor command. The method further includes incrementing an open contactor timer value in response to neither the valid close contactor command nor the valid open contactor command being received. The method also includes comparing the open contactor timer value to a predetermined time. The method further includes opening a contactor in response to at least one of the open contactor timer value being greater than the predetermined time and receiving a valid open command.

In another exemplary embodiment, the method of controlling a contactor in an HV electrical circuit utilizes a contactor having a coil for facilitating closing of the contacts. The method includes monitoring a signal for a valid close contactor command. The method further includes sensing a low voltage ("LV") circuit voltage to be supplied to the coil in response to receiving the valid close contactor command. The method further includes comparing the LV circuit voltage sensed to a first threshold value. The method also includes inhibiting closing of the contactor in response to the LV circuit voltage being less than the first threshold value.

In yet another exemplary embodiment, a method of controlling a contactor in an HV electrical circuit utilizes a contactor having a first contact electrically connectable to a power supply and a second contact electrically connectable to a load. The method includes monitoring a data signal for a valid open contactor command. The method further includes opening the contactor in response to receiving the valid open contactor command. The method also includes sensing a voltage at the first contact and a voltage at the second contact. The method further includes determining a fault in the opening of the contactor based on the voltage at the first contact and the voltage at the second contactor. In response, the fault is signaled to a user.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, an electrical system 100 is shown and described herein.

Figure 1:
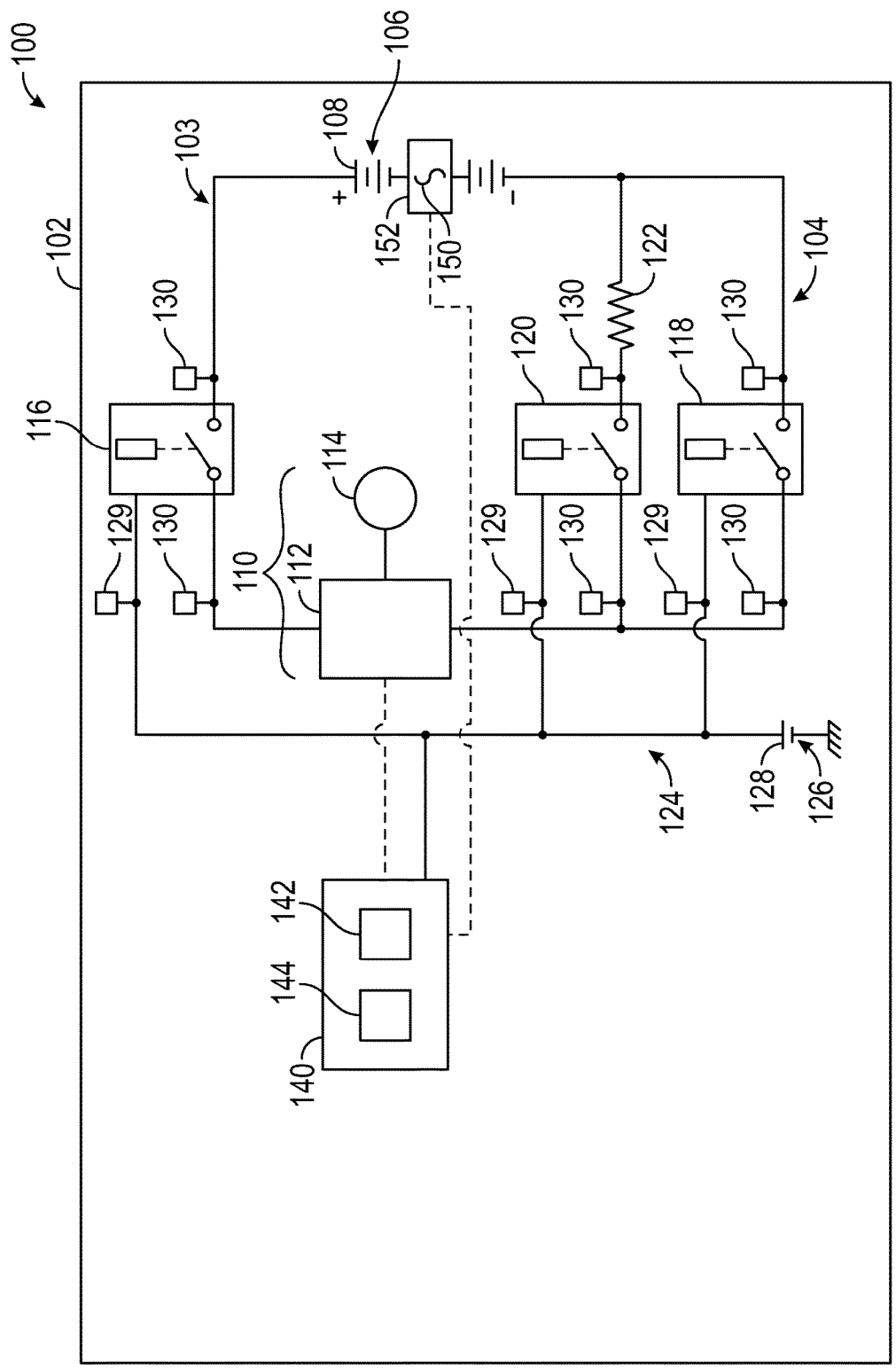
FIG. 1 is a schematic block diagram illustrating an electrical system of a vehicle according to one exemplary embodiment.

The electrical system 100 shown in the exemplary embodiment of FIG. 1 is implemented in a vehicle 102 such as an automobile (not separately numbered). However, it should be appreciated that the electrical system 100 may be implemented in other vehicles 102, including, but not limited to, motorcycles, aircraft, locomotives, and boats. Furthermore, the electrical system 100 shown and described herein may also be implemented in non-vehicle applications (not shown).

The electrical system 100 includes a high voltage ("HV") electrical circuit 103, 104. The HV electrical circuit includes an HV positive circuit 103 and an HV negative circuit 104. In the exemplary embodiment, the HV electrical circuit 103, 104 is configured to support voltages greater than 60 volts (V). An HV power supply 106 is electrically connected to the HV positive circuit 103 and the HV negative circuit 104. In the exemplary embodiment, the HV power supply 106 includes a battery 108 having a plurality of cells (not separately numbered). Of course, the HV power supply 106 may be implemented with other devices including, but not limited to, a solar cell (not shown). Furthermore, a plurality of HV power supplies 106 may be electrically connected to the HV electrical circuit 103, 104.

The HV electrical circuit 103, 104 is also electrically connected to a load 110. In the exemplary embodiment, the load 110 includes a traction power inventor module ("TPIM") 112, sometimes referred to simply as a "traction inventor." The load 110 of the exemplary embodiment also includes an electric motor 114 electrically connected to the TPIM 112. The electric motor 114 may be coupled to an axle (not shown) and/or wheels (not shown) for propelling the vehicle 102 as is appreciated by those skilled in the art.

The HV electrical circuit 103, 104 also includes at least one contactor 116, 118, 120 for opening (i.e., preventing current flow) and or closing (i.e., enabling current flow) the circuit 103, 104. Specifically, in the exemplary embodiment, a positive contactor 116 is electrically connected to the HV positive circuit 103 while a negative contactor 118 and a precharge contactor 120 are electrically connected to the HV negative circuit 104. Each contactor 116, 118, 120 includes a first contact (not numbered), a second contact (not numbered), and a coil (not numbered). When energized, the coil, i.e., an electromagnet, actuates the contacts together or apart to close or open the circuit, as is appreciated by those skilled in the art.

In the exemplary embodiment, the first contact of the positive contactor 116 is electrically connected to a positive pole (not numbered) of the HV power supply 106 while the second contact is electrically connected to the load 110. The first contacts of the negative contactor 118 and the precharge contactor 120 are electrically connected to a negative pole (not numbered) of the HV power supply 106 while the second contacts are electrically connected to the load 110. A precharge resistor 122 is disposed between the first contact of the precharge contactor 120 and the negative pole of the HV power supply 106. It should be appreciated that the at least one contactor 116, 118, 120 may be connected in any number of configurations in the HV electrical circuit 103, 104.

The electrical system 100 further includes a low voltage ("LV") electrical circuit 124. In the exemplary embodiment, the LV electrical circuit 124 is configured to support voltages of about 12 volts (V). The LV electrical circuit 124 includes an LV power supply 126. In the exemplary embodiment, the LV power supply 126 includes a battery 128 having a plurality of cells (not separately numbered). Of course, the LV power supply 126 may be implemented with other devices. Furthermore, the LV electrical circuit 124 may include a plurality of LV power supplies 126.

The LV electrical circuit 124 is electrically connected to the at least one contactor 116, 118, 120 for supplying power to the at least one contactor 116, 118, 120. The power supplied to the at least one contactor 116, 118, 120 by the LV electrical circuit 124 may be utilized to energize the coil and/or for other purposes. The LV electrical circuit 124 may also be electrically connected to numerous other components (not shown) in the vehicle 102.

The electrical system 100 may also include an LV circuit sensor 129. The LV circuit sensor 129 is electrically connected to the LV circuit 124 for sensing the voltage present on the LV electrical circuit 124. In the exemplary embodiment shown in FIG. 1, the system 100 includes a plurality of LV circuit sensors 129. More specifically, one LV circuit sensor 129 is associated with each of the contactors 116, 118, 120 such that each respective LV circuit sensor 129 senses the voltage being supplied to the respective contactor 116, 118, 120.

The electrical system 100 may further include an HV circuit sensor 130. The HV circuit sensor 130 is electrically connected to the HV circuit 103, 104 for sensing the voltage present on the HV circuit 103, 104. In the exemplary embodiment, the system 100 includes a plurality of HV circuit sensors 130. More specifically, one HV circuit sensor 130 is associated with each contact of each contactor 116, 118, 120. As such, the HV circuit sensors 130 may sense the voltage at each contact of the contactors 116, 118, 120. This allows the voltage difference across each contactor 116, 118, 120 to also be determined.

The electrical system 100 also includes a controller 140. The controller 140 of the exemplary embodiment includes a processor 142 capable of performing calculations and executing instructions (i.e., running a program). The processor 142 may be implemented with a microprocessor, microcontroller, application specific integrated circuit ("ASIC") or other suitable device. Of course, the controller 140 may include multiple processors 142 which may, or may not, be disposed in multiple locations. The controller 140 of the exemplary embodiment also includes a memory 144 capable of storing data and in communication with the processor 142 for transferring data. The memory 144 may be implemented with semiconductors (not shown) or any other suitable devices. Multiple memories 144 may also be utilized. Furthermore, the memory 144 may be integrated with the processor 142 or be separate from the processor 142.

The controller 140 is in communication with the at least one contactor 116, 118, 120. This communication includes sending commands from the controller 140 to the at least one contactor 116, 118, 120. As such, the controller 140 may control operation, i.e., opening and closing, of the at least one contactor 116, 118, 120. The controller 140 may also be in communication with the LV circuit sensor 129 and/or the HV circuit sensor 130. This communication includes sending data regarding the respective voltages to the controller 140.

Figure 2:
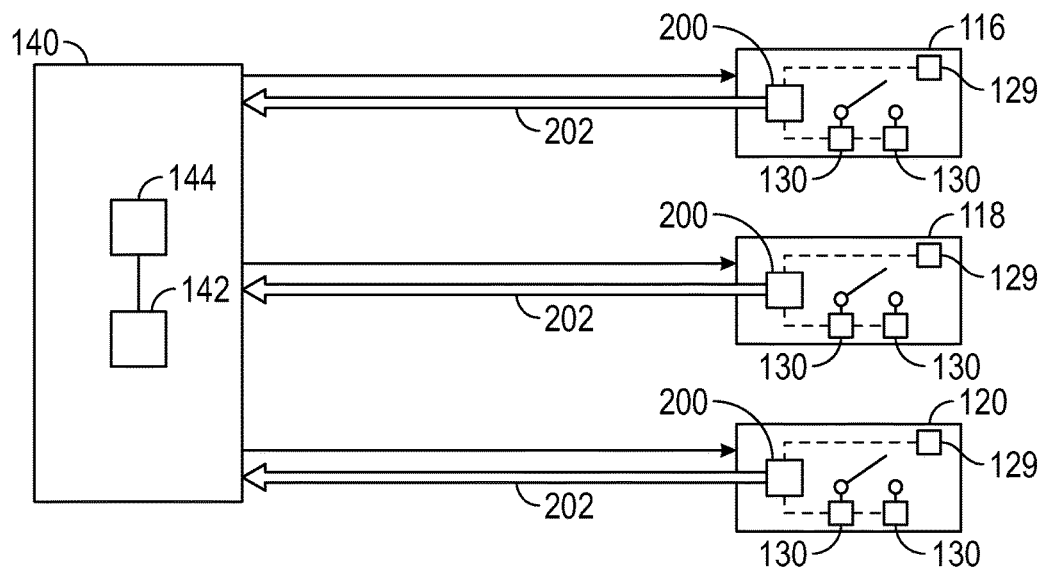
FIG. 2 is a schematic block diagram illustrating communications between a controller and a plurality of contactors according to one exemplary embodiment.

In an exemplary embodiment shown in FIG. 2, each contactor 116, 118, 120 may be implemented as a "smart" device. Specifically, each contactor 116, 118, 120 includes a processor 200. The processor 200 may be implemented with a microprocessor, microcontroller, ASIC or other suitable device. Each contactor 116, 118, 120 may also include a memory (not shown).

In this exemplary embodiment, each processor 200 is in communication with the LV circuit sensor 129 and the HV circuit sensors 130 associated with each respective contactor 116, 118, 120. Each processor 200 is in communication with the controller 140 via a unidirectional data communication line 202. As such, data regarding the sensors 129, 130 may be easily communicated from each contactor 116, 118, 120 to the controller 140. The controller 140 is also in communication with each contactor 116, 118, 120 via a unidirectional dedicated command circuit 204. Accordingly, the controller 140 may command the contactor 116, 118, 120 to open or close as necessary and as described in greater detail below.

Figure 3:
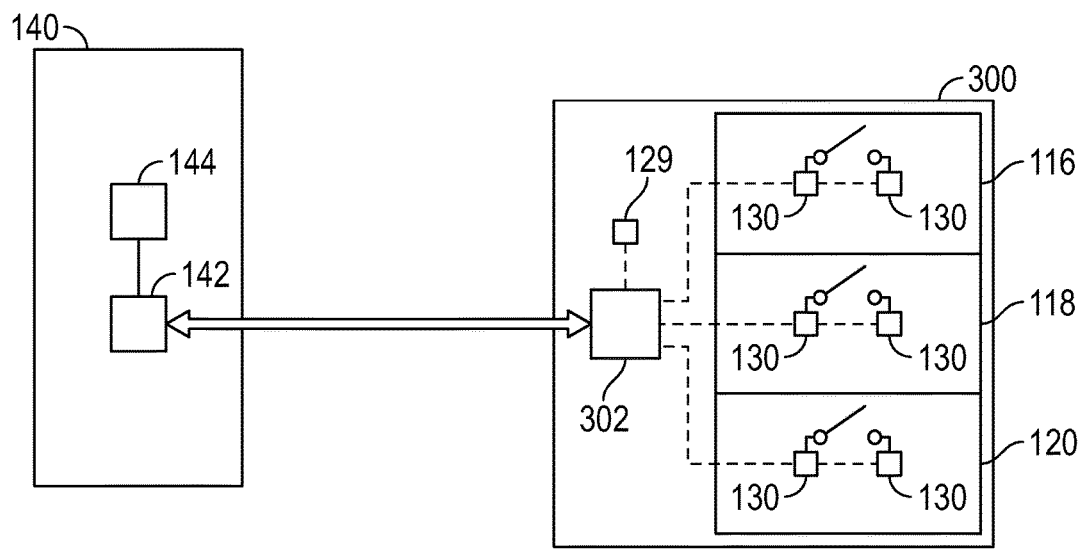
FIG. 3 is a schematic block diagram illustrating communications between the controller and a contactor control module according to one exemplary embodiment.

In an exemplary embodiment shown in FIG. 3, the electrical system 100 further includes a contactor control module 300. The contactor control module 300 includes a contactor control processor 302, which may be implemented with a microprocessor, microcontroller, ASIC or other suitable device. The contactor control processor 302 is in communication with the processor 142 of the controller 140 via a bi-directional data communications link 404. In the exemplary embodiment, the data communications link may be a controller area network ("CAN") bus. Of course, other methods, protocols, and hardware may be implemented to facilitate communications via the bi-directional data communications link 404.

The embodiment shown in FIG. 3 includes a single LV circuit sensor 129 and a pair of HV circuit sensors 130 corresponding to each contactor 116, 118, 120. The circuit sensors 129, 130 are in communication with the processor 302 such that this data may be conveyed to the processor 142 of the controller 140.

Figure 4:
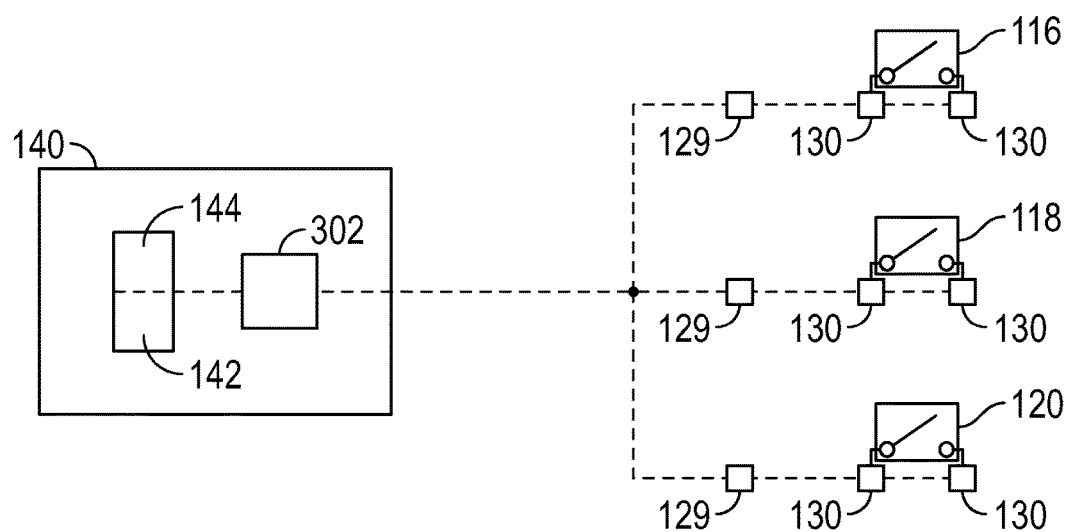
FIG. 4 is a schematic block diagram illustrating communications between the controller and a plurality of sensors and the plurality of contactors according to one exemplary embodiment.

In an exemplary embodiment shown in FIG. 4, the contactor control processor 302 may be integrated with the controller 140. That is, the processor 142 and the contactor control processor 302 are physically disposed near one another in the controller 140 and are in communication with one another. In turn, the sensors 129, 130 and the contactors 116, 118, 120 are in communication with the contactor control processor 302 such that the contactor control processor 302 receives data from the sensors 126, 130 and controls operation of the contactors 116, 118, 120.

The embodiments presented in FIGS. 2-4 are merely three exemplary configurations for implementing communications between the controller 140, the contactors 116, 118, 120 and the circuit sensors 126, 130. Those skilled in the art will appreciate other techniques and configurations for facilitating such communications.

Referring again to FIG. 1, the HV power supply 106 may include a fuse 150. The fuse 150 is coupled to a high-voltage interlock ("HVIL") 152 which generates an HVIL signal when the fuse 150 is removed, thus disconnecting the HV power supply 106.

Figure 5:
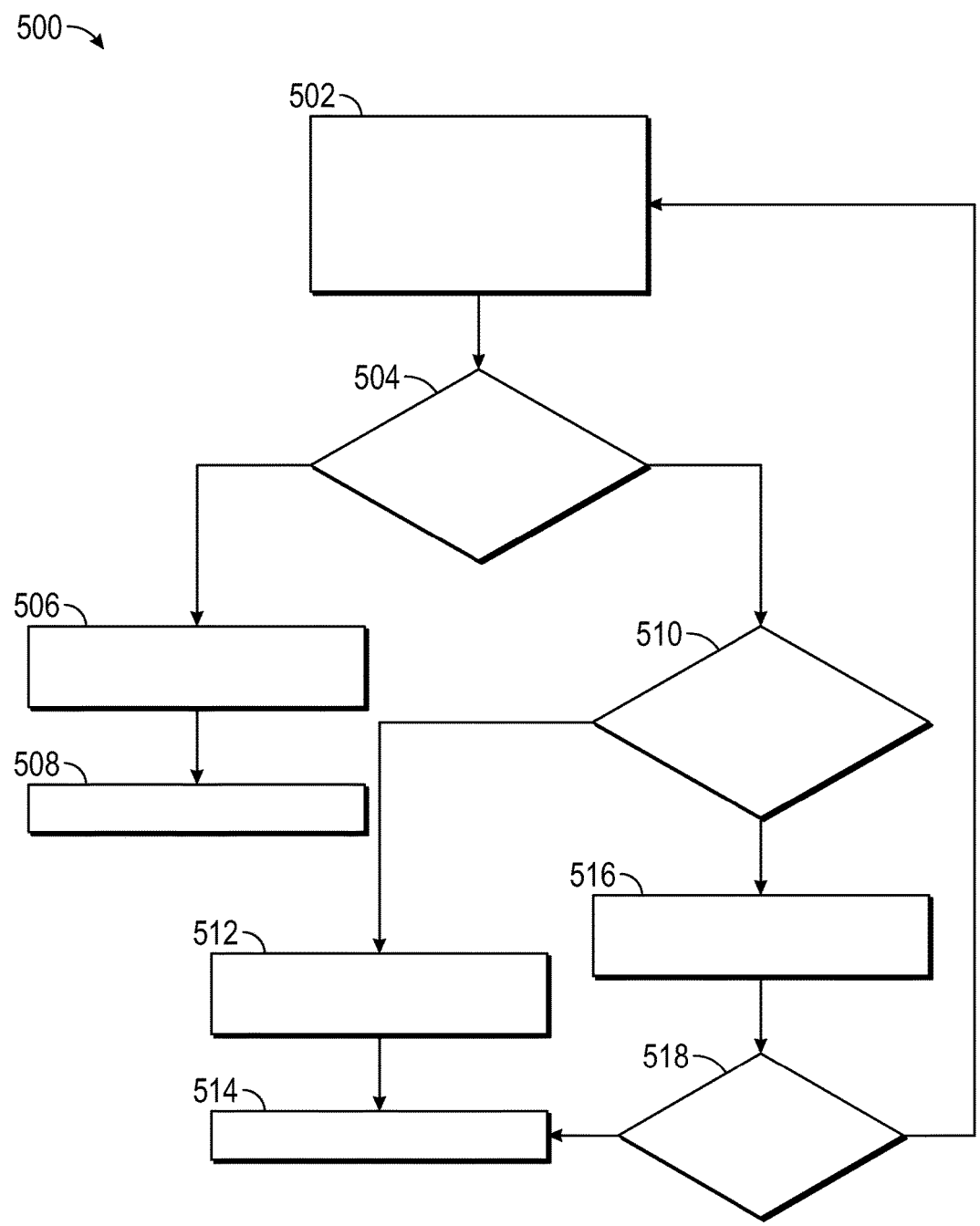
FIG. 5 is a flow chart illustrating a method of controlling at least one contactor according to one exemplary embodiment.

FIG. 5 illustrates an exemplary method 500 for controlling at least one contactor 116, 118, 120. This method 500 may be executed, i.e., run, by the contactor control processor 200. This method utilizes an open contactor timer value that is stored in a memory of the contactor control processor 200 and is described in greater detail below.

The method 500 includes, at 502, monitoring a signal sent from the controller 140 and received at the contactor control processor 200. Specifically, the signal is monitored for receipt of either a valid close contactor command or a valid open contactor command. As such, the method 500 further includes, at 504, determining whether a valid close contactor command is received. In response to a valid close contactor command being received, the method 500 includes, at 506, resetting the open contactor timer value, i.e., setting the open contactor timer value to zero. The method 500 also includes, at 508, closing the contactor 116, 118, 120, in response to the valid close contactor command being received.

If a valid close contactor command is not received, then the method 500 continues, at 510, with determining whether a valid open contactor command is received. In response to a valid open contactor command being received, the method 500 includes, at 512, resetting the open contactor timer value, and, at 514, opening the contactor 116, 118, 120.

In response to neither a valid close contactor command nor a valid open contactor command being received, the method 500 further includes, at 516, incrementing the open contactor timer value. That is, the open contactor timer value is increased to reflect the time passed since the open contactor timer value was last reset.

The method 500 also includes, at 518, comparing the open contactor timer value to a predetermined time. If the open contactor timer value is less than the predetermined time, then no action is taken. However, in response to the open contactor timer value being greater than or equal to the predetermined time, then the method 500 continues, at 514, with opening the contactor 116, 118, 120.

The controller 140 will send either a valid close command or a valid open command during most normal operations of the vehicle. However, some conditions may occur in which no valid close or open command is received by the contactor control processor 200. For example, the processor 142 of the controller 140 may unexpectedly reset during driving of the vehicle 102. During that reset time, no valid close or open commands are sent by the controller 140. As another example, communications between the controller 140 and the contactor control processor 200 may be lost for environmental reasons. In such temporary conditions, it is not advantageous to open the contactor 116, 118, 120 and thus remove power from driving the motor 114. Accordingly, the open contactor timer value is utilized to minimize opening of the contacts 116, 118, 120 for such conditions.

Figure 6:
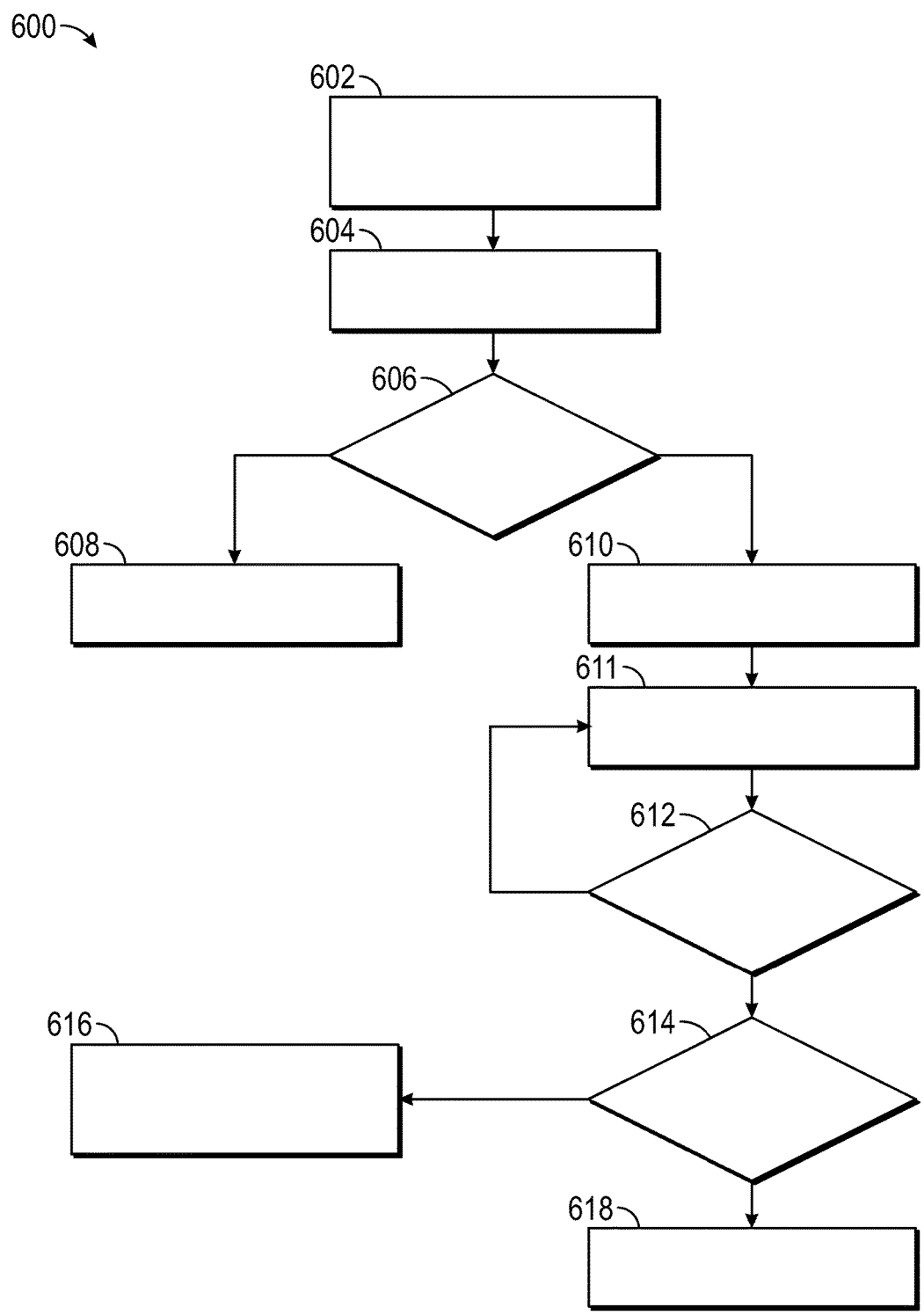
FIG. 6 is a flow chart illustrating a method of closing at least one contactor according to one exemplary embodiment.

FIG. 6 illustrates an exemplary method 600 for controlling at least one contactor 116, 118, 120. This method 600 may be executed, i.e., run, by the contactor control processor 200. The method 600 utilizes a first threshold value, a second threshold value, and a third threshold value, which may be stored in a memory in communication with the processor 200.

The method 600 includes, at 602, monitoring a data signal received from the controller 140 for a valid close contactor command. In response to a valid close contactor command being received, the method 600 further includes, at 604, sensing the LV circuit voltage. The LV circuit is utilized to actuate the coil of the contactor 116, 118, 120. Sensing the LV circuit voltage may be accomplished utilizing the LV circuit sensor 129.

The method 600 also includes, at 606, comparing the LV circuit voltage sensed to the first threshold value. The first threshold value generally corresponds to the minimum voltage needed to actuate closure of the contactor 116, 118, 120. In response to the LV circuit voltage being less than the first threshold value, then the method 600 includes, at 608, inhibiting closing of the contactor 116, 118, 120. Said another way, the contactor 116, 118, 120 is prevented from closing if the LV circuit voltage is less than necessary to properly close the contactor 116, 118, 120. By preventing closing in this manner, the contactor 116, 118, 120 is protected from damage that may occur due to electric arcs between the contacts.

In response to the LV circuit voltage being greater than or equal to the first threshold value, the method 600 continues, at 610, with closing the contactor 116, 118, 120. While the contactor 116, 118, 120 is closed, sensing the LV circuit voltage continues at 611. The method 600 thus also includes, at 612, comparing the LV circuit voltage sensed to the second threshold value. In the exemplary embodiment, the second threshold value is less than the first threshold value and corresponds generally to a voltage necessary to maintain the closure of the contactor 116, 118, 120. If the LV circuit voltage is greater than or equal to the second threshold value, then no action is taken. Conversely, in response to the LV circuit voltage being less than the second threshold value, the method 600 continues, at 614, with comparing the LV circuit voltage to the third threshold value while the contactor 116, 118, 120 is closed. In the exemplary embodiment, the third threshold value is less than the first and second threshold values.

In response to the LV circuit voltage being greater than or equal to the third threshold value, the method 600 continues with, at 616, opening the contactor 116, 118, 120 according to a controlled shutdown. That is, the contactor 116, 118, 120 is opened in a controlled procedure after a certain time delay and/or in accordance with the shutdown of other systems.

However, in response to the LV circuit voltage being less than the third threshold value, the method 600 continues, at 618, with opening the contactor 116, 118, 120 immediately. Such immediate opening of the contactor 116, 118, 120 may result from the total loss of LV circuit voltage, thus indicating an operational error.

Figure 7:
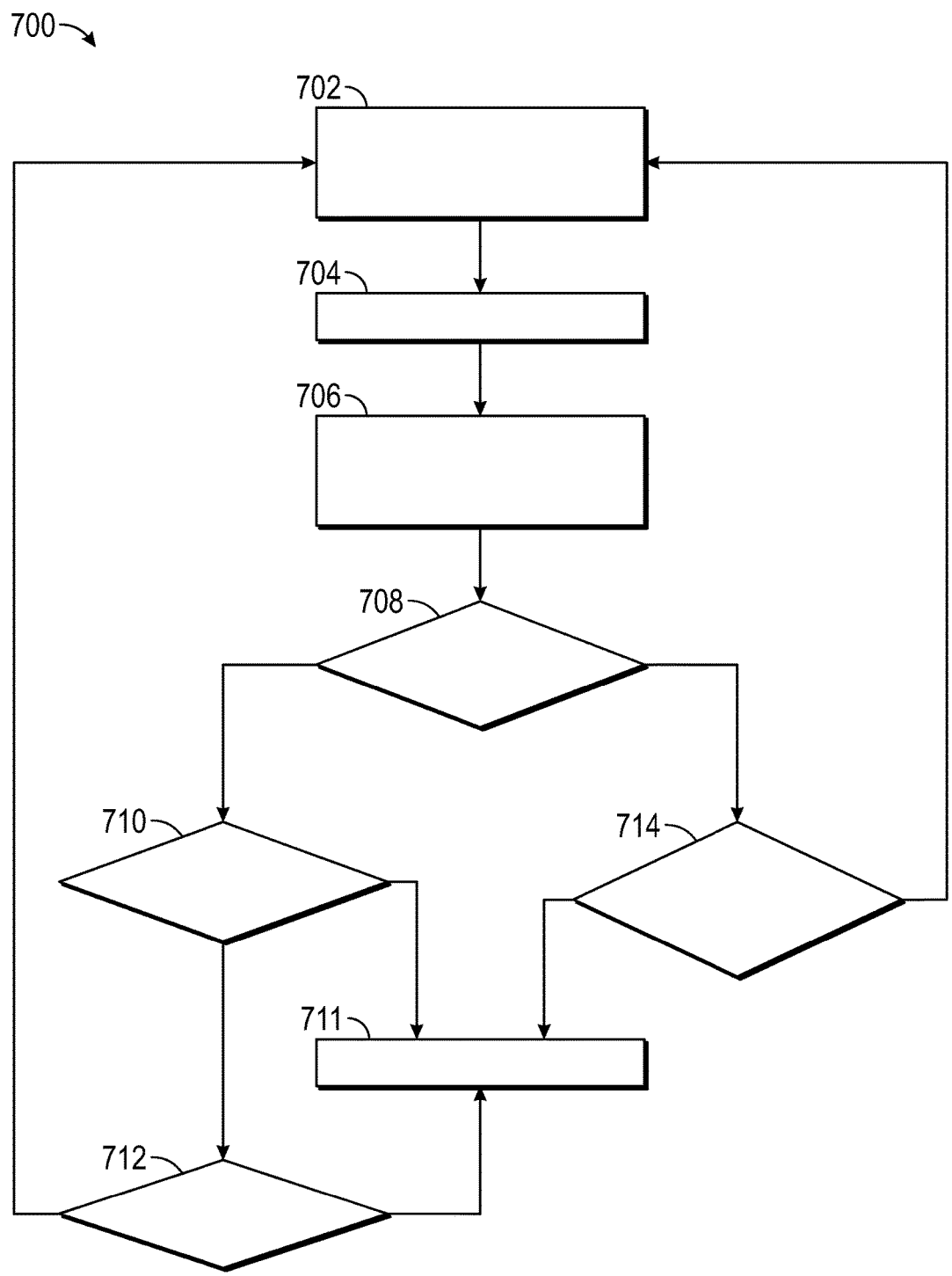
FIG. 7 is a flow chart illustrating a method of opening at least one contactor according to one exemplary embodiment.

FIG. 7 illustrates an exemplary method 700 for controlling at least one contactor 116, 118, 120. This method 700 may be executed, i.e., run, by the contactor control processor 200. This method 700 begins while the contactor 116, 118, 120 is closed.

The method 700, includes, at 702, monitoring a data signal received from the controller 140 for a valid open contactor command. In response to a valid open contactor command being received, the method 700 further includes, at 704, with opening the contactor 116, 118, 120. After a suitable time delay to allow the contactor 116, 118, 120 to open, the method 700 continues, at 706, with sensing the HV circuit voltage on both contacts of the contactor 116, 118, 120. Said another way, HV circuit voltage is sensed on either "side" of the contactor 116, 118, 120. Sensing the HV circuit voltage may be accomplished utilizing the HV circuit sensors 130.

The method 700 continues, at 708, comparing the HV circuit voltage on the first contact of the contactor 116, 118, 120 to the HV circuit voltage on the second contact. If the voltage on both contacts of the contactor 116, 118, 120 is generally equal to one another then the method 700 continues, at 710, with determining whether the voltage on each side of the contactor 116, 118, 120 is generally equal to zero. If the voltage on each side of the contactor 116, 118, 120 is not generally equal to zero, then the method 700 continues, at 711, with issuing an alarm signal, as described in greater detail below.

The term "generally equal," as used herein, refers to voltages that are about the same, within a reasonable margin of error. For instance a sensed voltage of 67.3 V would be generally equal to a sensed voltage of 68.2 volts. Similarly, a sensed voltage of 0.2 V or −0.4 V would be generally equal to zero. Of course, the reasonable margin of error may vary based on the voltages being measured, the sensing devices being utilized, and/or other factors.

When the voltage on each side of the contactor 116, 118, 120 is substantially equal to zero, it may be indicative of the HV power supply 106 being disconnected from the HV circuit 103, 104. Thus, the method 700 includes, at 712, with checking the HVIL signal to determine if the fuse 150 has been properly removed in response to the voltage on each side of the contactor 116, 118, 120 being substantially equal to zero. If the fuse 150 has been properly removed, then no action is taken. If the fuse 150 was not properly removed, and the voltage on each side of the contactor 116, 118, 120 is substantially equal to zero, then the method 700 continues, at 711, with issuing the alarm signal.

In response to the voltage not being equal on each side of the contactor 116, 118, 120, the method 700 further includes, at 714, with determining if the difference between the voltage on the first contact and the voltage on the second contact is greater than a predetermined threshold value. In one embodiment, the predetermined threshold is about 20 V. However, it should be appreciated that the predetermined threshold may be different based on voltage of the HV circuit 103, 104, specifications of the contactor 116, 118, 120, and/or other factors.

If the difference between voltages on the contacts is not greater than the predetermined threshold, then it may be indicative of a fused or welded contactor 116, 118, 120. As such, the method 700 continues, at 711, with issuing the alarm signal. If the difference between voltages on the contacts is greater than the predetermined threshold, then it typically indicates that contactor 116, 118, 120 has opened properly, and no further action is taken.

The alarm signal may be presented to a user, e.g., the driver of the vehicle 102, with a message on a display (not shown), the illumination of a light (not shown), an audible signal, and/or any other suitable annunciation. Furthermore, the alarm signal may be transmitted, e.g., via radio frequency signals, from the vehicle 102 to a service center, a smart phone, or any other device configured to receive such signals.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a contactor in a high voltage electrical circuit of a vehicle, the method comprising:
   monitoring a signal for at least one of a close contactor command and an open contactor command;
   incrementing an open contactor timer value in response to neither the close contactor command nor the open contactor command being received;
   comparing the open contactor timer value to a predetermined time; and
   opening a contactor in response to at least one of the open contactor timer value being greater than the predetermined time and receiving an open command.

2. The method as set forth in claim 1 further comprising closing the contactor in response to receiving the close contactor command.

3. The method as set forth in claim 1 further comprising resetting the open contactor timer value in response to at least one of receiving the close contactor command and receiving the open contactor command.

4. The method as set forth in claim 1 wherein the contactor includes a first contact, a second contact, and a coil for facilitating closing of the contacts, the method further comprising sensing a low voltage ("LV") circuit voltage to be supplied to the coil in response to receiving the close contactor command.

5. The method as set forth in claim 4 further comprising comparing the LV circuit voltage to a predetermined minimum voltage.

6. The method as set forth in claim 5 further comprising inhibiting closing of the contactor in response to the LV circuit voltage being less than a first threshold value.

7. The method as set forth in claim 5 further comprising closing the contactor in response to receiving the close contactor command and the LV circuit voltage being greater than or equal to a threshold value.

8. The method as set forth in claim 1 wherein the contactor includes a first contact and a second contact, the method further comprising:
   sensing a voltage at the first contact and a voltage at the second contact;
   determining a fault in the opening of the contactor based on a difference between the voltage at the first contact and the voltage at the second contact; and
   signaling the fault to a user.

9. The method as set forth in claim 8 wherein determining the fault in the opening of the contactor includes determining the fault based on a difference between the voltage at the first contact and the voltage at the second contact being less than a predetermined threshold.

10. The method as set forth in claim 8 wherein determining the fault in the opening of the contactor includes determining the fault based on the voltage at the first contact and the voltage at the second contact being generally equal to one another and not generally equal to zero.

11. The method as set forth in claim 8 wherein determining the fault in the opening of the contactor includes determining the fault based on the voltage at the first contact and the voltage at the second contact being generally equal to zero and receiving a high voltage interlock signal.

12. A method of controlling a contactor in a high voltage electrical circuit, the contactor including a coil for closing the contactor, the method comprising:
    monitoring a signal for a close contactor command and an open contactor command;
    incrementing an open contactor timer value in response to neither the close contactor command nor the open contactor command being received;
    sensing a low voltage ("LV") circuit voltage to be supplied to the coil in response to receiving the close contactor command;
    comparing the open contactor timer value to a predetermined time;
    comparing the LV circuit voltage sensed to a first threshold value; and
    inhibiting closing of the contactor in response to the LV circuit voltage being less than the first threshold value;
    opening the contactor in response to at least one of the open contactor timer value being greater than the predetermined time and receiving an open command.

13. The method as set forth in claim 12 further comprising commanding closing of the contactor in response to the coil voltage being greater than or equal to the first threshold value.

14. The method as set forth in claim 13 further comprising:
    comparing the coil voltage sensed to a second threshold value; and
    opening the contactor according to a controlled shutdown in response to the coil voltage being less than the second threshold value.

15. The method as set forth in claim 13 further comprising:
    comparing the coil voltage sensed to a third threshold value; and
    opening the contactor immediately in response to the coil voltage being less than the third threshold value.

16. A method of controlling a contactor in a high voltage electrical circuit, the contactor having a first contact electrically connectable to a power supply and a second contact electrically connectable to a load, the method comprising:
    monitoring a data signal for an open contactor command;
    opening the contactor in response to receiving the open contactor command;
    sensing a voltage at the first contact and a voltage at the second contact;
    determining a fault in the opening of the contactor based on the voltage at the first contact and the voltage at the second contact; and
    signaling the fault to a user;
    wherein determining the fault in the opening of the contactor includes determining the fault based on the voltage at the first contact and the voltage at the second contact being generally equal to zero and receiving a high voltage interlock signal.

17. The method as set forth in claim 12 further comprising sensing a voltage at a first contact and a voltage at a second contact and determining a fault based on a difference between the voltage at the first contact and the voltage at the second contact being less than a predetermined threshold.

18. The method as set forth in claim 12 further comprising sensing a voltage at a first contact and a voltage at a second contact and determining a fault based on the voltage at the first contact and the voltage at the second contact being generally equal to one another and not generally equal to zero.

19. The method as set forth in claim 12 further comprising sensing a voltage at a first contact and a voltage at a second contact and determining a fault based on the voltage at the first contact and the voltage at the second contact being generally equal to zero and receiving a high voltage interlock signal.

* * * * *